US009924700B1

(12) United States Patent
Kuper et al.

(10) Patent No.: US 9,924,700 B1
(45) Date of Patent: Mar. 27, 2018

(54) ASYNCHRONOUS CAPTURE, PROCESSING, AND ADAPTABILITY OF REAL-TIME FEEDER LIVESTOCK RATION WEIGHT INFORMATION AND TRANSFER OVER WIRELESS CONNECTION FOR MOBILE DEVICE, MACHINE-TO-MACHINE SUPPLY CHAIN CONTROL, AND APPLICATION PROCESSING

(71) Applicant: PERFORMANCE LIVESTOCK ANALYTICS, INC., St. Ansgar, IA (US)

(72) Inventors: Dane T. Kuper, St. Ansgar, IA (US); Dustin C. Balsley, Osage, IA (US); Thomas N. Blair, San Francisco, CA (US)

(73) Assignee: PERFORMANCE LIVESTOCK ANALYTICS, INC., St. Ansgar, IA (US)

( * ) Notice: Subject to any disclaimer, the term of this patent is extended or adjusted under 35 U.S.C. 154(b) by 0 days.

(21) Appl. No.: 15/828,109

(22) Filed: Nov. 30, 2017

Related U.S. Application Data

(60) Provisional application No. 62/428,959, filed on Dec. 1, 2016.

(51) Int. Cl.
*A01K 5/00* (2006.01)
*A01K 5/02* (2006.01)
(Continued)

(52) U.S. Cl.
CPC ............ *A01K 5/0283* (2013.01); *A01K 5/001* (2013.01); *G06F 15/18* (2013.01); *G06Q 50/28* (2013.01);
(Continued)

(58) Field of Classification Search
CPC ........ A01K 5/02; A01K 5/0283; A01K 5/001; A01K 29/005; A01K 11/006; G06Q 10/087; G06Q 50/02
(Continued)

(56) References Cited

U.S. PATENT DOCUMENTS 5,673,647 A * 10/1997 Pratt .................... A01K 1/0023
119/51.02
6,664,897 B2 * 12/2003 Pape .................... A01K 29/005
119/51.02
(Continued)

*Primary Examiner* — Yvonne R Abbott-Lewis
(74) *Attorney, Agent, or Firm* — Lazaris IP

(57) ABSTRACT

A method and system is provided in a framework and workflow for assisting in livestock feeding operations by tracking and weighing ingredients from an electronic scale associated with feed mixing equipment. The framework and workflow captures, transfers, stores and processes parameters for cattle feeder ration weight data collection. The method and system include initializing a collection of weight data related to components of a feed ration for a mixing of feed for livestock, capturing a scale identifier from a scale interface on mixing equipment, and capturing weight information from the scale interface as the components of a feed ration are loaded into the mixing equipment. Such information is broadcasted over a wireless radio communication connection, such as via a Bluetooth® device, to a mobile application, and displayed during feed mixing operation.

22 Claims, 2 Drawing Sheets

(51) Int. Cl.
*H04W 4/00* (2018.01)
*H04W 4/02* (2018.01)
*G06F 15/18* (2006.01)
*G06Q 50/28* (2012.01)

(52) U.S. Cl.
CPC ........... *H04W 4/006* (2013.01); *H04W 4/008* (2013.01); *H04W 4/02* (2013.01)

(58) Field of Classification Search
USPC .................. 119/51.02, 51.01, 842, 511, 515
See application file for complete search history.

(56) References Cited

U.S. PATENT DOCUMENTS

| | | | | |
|---|---|---|---|---|
| 6,868,804 B1* | 3/2005 | Huisma | ................ | A01K 11/006 119/51.02 |
| 6,974,373 B2* | 12/2005 | Kriesel | ................ | A01K 11/008 452/157 |
| 7,296,537 B2* | 11/2007 | Burghardi | ................ | A01K 5/02 119/51.02 |
| 7,441,515 B2* | 10/2008 | Renz | ...................... | A01K 29/00 119/174 |
| 8,245,664 B2* | 8/2012 | Mulder | .................. | A01K 29/00 119/51.01 |
| 8,584,619 B2* | 11/2013 | Eakin | ..................... | A01K 29/00 119/511 |
| 8,655,751 B2* | 2/2014 | Renz | .................. | G06Q 10/0875 119/51.01 |
| 8,862,481 B2* | 10/2014 | Young | ..................... | A01K 5/02 705/1.1 |
| 8,930,148 B2* | 1/2015 | Huisma | ................ | A01K 29/005 119/51.02 |
| 2002/0007798 A1* | 1/2002 | Pavlak | ..................... | A01K 5/02 119/51.01 |
| 2006/0201432 A1* | 9/2006 | Pratt | ..................... | A01K 29/00 119/51.02 |
| 2017/0013802 A1* | 1/2017 | Zimmerman | ........ | A01K 5/0107 |

* cited by examiner

ASYNCHRONOUS CAPTURE, PROCESSING, AND ADAPTABILITY OF REAL-TIME FEEDER LIVESTOCK RATION WEIGHT INFORMATION AND TRANSFER OVER WIRELESS CONNECTION FOR MOBILE DEVICE, MACHINE-TO-MACHINE SUPPLY CHAIN CONTROL, AND APPLICATION PROCESSING

CROSS-REFERENCE TO RELATED PATENT APPLICATION(S)

This patent application claims priority to U.S. provisional application 62/428,959, filed on Dec. 1, 2016, the contents of which are incorporated in their entirety herein. In accordance with 37 C.F.R. § 1.76, a claim of priority is included in an Application Data Sheet filed concurrently herewith.

FIELD OF THE INVENTION

The present invention relates to livestock feeding operations. Specifically, the present invention relates to a system and method for accurate, real-time measurement of weight of livestock feed rations, the capture, transfer, processing, and adaptability of such information, and the use of such information for control of the entire machine-to-machine livestock feed supply chain.

BACKGROUND OF THE INVENTION

In livestock feeding operations, it is often the case that thousands of pounds of feed must be mixed together, and the resulting feed is then supplied to different enclosures or pens of livestock. Feed that is consumed by livestock is often composed of many different components, such as hay, oats, and corn, as well as other elements important to livestock diets such as minerals and other nutrients that are essential to healthy growth.

Due to the machinery needed to transport and combine these components in such quantities, it is often difficult to discern with precision how much of each component has been added to a feed mixer. For example, a desired ration may consist of 33% corn, 40% hay, and 27% oats. If a feeding of 4000 lbs. of such a ration to cattle is needed, one needs to load 1333 lbs. of corn into the feed mixer. A feed mixer is typically affixed with a scale, and an operator manning loading machinery must read the scale to know how many pounds are in the mixer in order to determine when to stop loading. This is an inefficient process that often produces an unbalanced ration, and lower end results. If the feeding mixture is not correct, livestock may go off feed, resulting in reduced weight gain and lower profit for producers. A real-time approach to tracking the amount of each component loaded into mixing equipment to ensure that livestock health and growth is maintained and efficiently managed is therefore missing in the current technology.

In addition, the supply chain for enabling feedlot workflows depends at least in part on temporal efficiencies for making sure each machine and each person in the process has an accurate understanding of the contents of a feed ration, and when activities are needed to be performed. For example, the operation of different machines in the process of preparing and mixing the desired ration of the example above need to be coordinated so that loading equipment is properly loaded with the right amount and type of feed component at the right time. Additionally, any additives in the feed ration must be prepared in the necessary amount, quantity of each component, temperature, brand/product name, etc. In the existing art, there is no current method of ensuring that machines and persons in the supply chain for such workflows is fully synchronized and integrated based on collected feed ration data and using asynchronous capture, processing and adaptability of real-time livestock ration weight information.

BRIEF SUMMARY OF THE INVENTION

The present invention is a system and method for assisting in livestock feeding operations by tracking and weighing ingredients from an electronic scale. The system and method is provided in a framework and workflow for the capture, transfer, storage, and processing of parameters for cattle feeder ration weight data. The present invention includes, in one aspect thereof, selecting at least one scale identifier and at least one subscriber identifier from a subscriber and scale database, associating at least one trigger condition for the weighing operation with at least one selected scale identifier in the database, associating at least one scale identification parameter and weight to be collected at an occurrence of at least one associated trigger condition with the selected scale identifier in the database, and transmitting the subscriber identifier, scale identifier and weight information to a mobile application associated with the scale identifier via a wireless connection. The present invention further includes, in another aspect thereof, applying the collected livestock weight ration information to a server-side application that enables control of the entire integrated machine-to-machine livestock feed supply chain that includes workflows as described herein.

The server-side application manages one or more processes for such a supply chain, so that high-precision feed components, additives, veterinary/medical specifications, and any other aspects of a feed ration are provided in the workflow, based upon livestock weight, location, weather type, genetic type, health condition, and other influencing factors.

It is therefore one objective of the present invention to provide a system and method of accurately determining a weight of each component added to a livestock feed ration during a mixing process. It is another objective of the present invention to provide a workflow for data capture, transfer, and processing in a mobile application and computing environment for real-time information adaptability during a feeding operation. It is a further objective of the present invention to minimize risk during a feeding process of livestock by ensuring that appropriate amounts of components of a feed ration are provided. It is yet another objective of the present invention to provide a system and method that applies information from such a workflow feeding process for end-to-end integration and control of machine-to-machine supply chain processes.

Other objects, embodiments, features, and advantages of the present invention will become apparent from the following description of the embodiments, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a system and method for utility in livestock feeding operations. In one aspect thereof, and with reference to FIG. 1, the present invention is a framework and workflow 100 for the asynchronous capture, transfer, storage, and processing of parameters related to a livestock feed ration 125, such as ration weight data 126 for one or more components of a feed ration 125 to be loaded and mixed. The present invention may also include one or more applications for enabling and working with such a framework and workflow 100, and for follow-on use of data generated and processed within the framework and workflow 100, for example for machine-to-machine integration of a supply chain for livestock feeding operations. The present invention enables improved accuracy in feed ration mixing, and allows livestock producers to ensure that their animals get the diet needed for proper growth and under the appropriate conditions. It is to be noted that the one or more applications, mobile or otherwise, for enabling and working with the present invention may be accessed using a computer-based platform, such as for example on a desktop, laptop, or tablet computing device, or a mobile telephony device.

Figure 1:
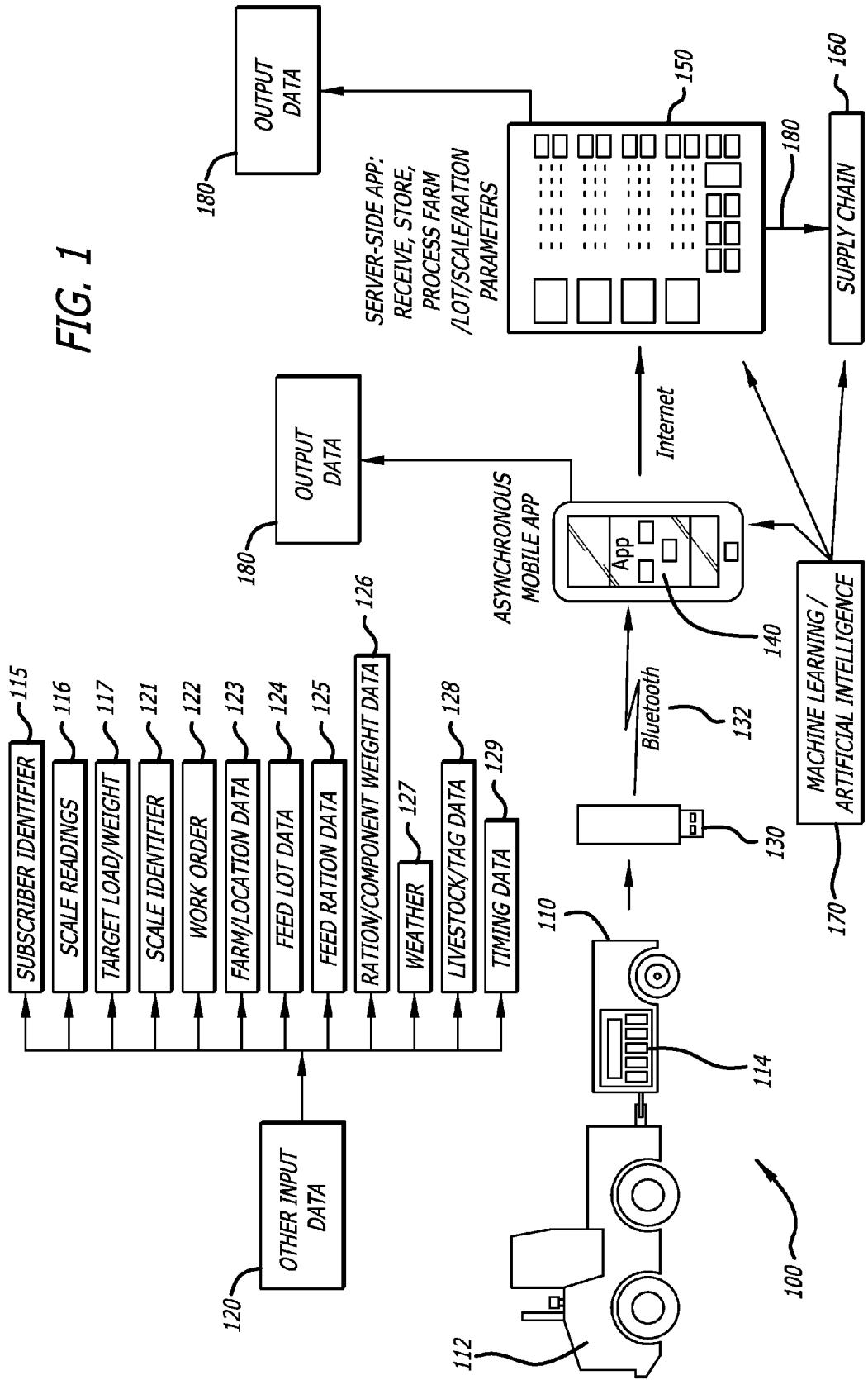
FIG. 1 is a diagram illustrating components in a framework and workflow for capturing, transferring, storing, and processing of parameters for livestock feeder ration weight information according to one embodiment of the present invention.

FIG. 1 below is an exemplary of illustration of a framework and workflow 100 of the present invention. The framework and workflow 100 is performed, in one embodiment of the present invention, using wireless radio communications 132 with Bluetooth® or similar devices for transfer of data 120. Livestock feed is weighed in a feeding mixer 110, often referred to as a wagon, which may have weigh bars and a scale head affixed therein, to accurately measure the contents of the feeding mixer 110 during or after loading of a particular component of a feed ration 125. In a mixing process, machinery 112 loads feed components into the mixer 110 until the scale 114 on the mixer 110 reads a certain targeted weight, and this information is captured by a device 130, for example a Bluetooth®-enabled dongle. The information is then transmitted using the Bluetooth® capability for wireless radio communications 132 on the device. The framework and workflow 100 also tracks what components are being filled in the mixer 110, as this information is provided to the operator of the loader (or the loader itself). The framework and workflow 100 may further track, in another embodiment, what is being delivered for consumption by livestock.

The framework and workflow 100 uses wireless radio communications 132, such as with or more Bluetooth® devices, for asynchronous data capture, transfer, and processing. In an asynchronous data transfer environment, there is no common clock signal between the senders and receivers. Use of wireless radio communication equipment such as Bluetooth®-enabled devices fosters data transfer in the present invention as no common clock signal is needed between the sending device on feed loading equipment, for example the Bluetooth® dongle, and the receiving device on feed mixing equipment. The framework and workflow 100 of the present invention therefore does not need to ensure that common clock signals are needed between data capture and data processing, enabling faster and easier capture, transfer, processing and adaptability of input data 120.

The framework and workflow 100 of the present invention incorporates various other types of input data 120, such as for example a scale identifier 121, a subscriber identifier 115, and readings 116 from scale components on mixing equipment 110 relative to weights of feed ration components as described further herein. These may be applied to a plurality of data processing components within a computing environment in which the systems and methods described herein are performed for additional processing, such as with one or more mathematical functions or models, and one or more layers of machine learning or artificial intelligence 170. The computing environment may include one or more processors and a plurality of software and hardware components, and the one or more processors and plurality of software and hardware components may be configured to execute program instructions or routines to perform the functions performed within the plurality of data processing components. Other types of input data 120 in the present invention include farm/location data 123, feedlot data 124, weather information 127, livestock data 128, and timing data 129.

The framework and workflow 100 includes transmitting information collected and broadcasted over the wireless radio communications 132 to a mobile application 140. The mobile application 140 is configured to receive, store, and further transmit collected weight ration information, for example for use in a server-side application or server 150. Regardless, and as noted herein, the mobile application 140 may be utilized by operators of loading equipment 112 to more accurately determine weights of the various components of a desired mixture of livestock feed 125, or automatically by the loading equipment 112 itself for the same purpose.

The server-side application 150 may be configured to enable control of machine-to-machine operations across an entire, integrated supply chain 160 of livestock feed operations. The server-side application 150 may include one or more servers, applications, interfaces, and displays than enable users and operators of the framework and workflow 100 of the present invention to perform functions based on input data 120, processed or otherwise, and output data 180. This may include automatic communications with machinery involved in the supply chain for a feed ration 125 as noted herein, and enable control/operation of that machinery to provide components for the feed ration 125.

The server-side application 150 includes one or more machine-to-machine interfaces, and generates and communicates supply chain events throughout the integrated feed ration preparation process that directs on-premise, farm automation mixing equipment and feed mill control systems, to apply high-precision measurements and dosage amounts of veterinary medicines, biological additives and feed ingredients including vitamins, additives and trace elements to the production of formulated feeds.

The processes performed by the server-side application 150 generates supply chain events that are used to command events, for example through an API interface. These events represent instructions that act to command and control equipment, such as a micro-feeder machine that is equipped with several hoppers of product supply to release correct dosage amounts, by product, to be delivered to each hopper. They also correlate information such as animal size, animal health conditions, and weather conditions, to specific head or group of cattle in a pen in order to optimize for precise and optimal micro-dosing in the feed ration 125.

These processes can, for example, provide high-precision dosing of micro-ingredients in a livestock feed ration 125, by dispensing ingredients into a scaling system that can be calibrated to high-precision definition and performance. The processes performed by the server-side application 150 may also be configured to generate alerts for a specific dosage amount, for example to the nearest hundredth of pounds, for ingredients such as micro-minerals, antibiotics, other nutrients, and biological agents. Machines may therefore be controlled in such a supply chain to mix rations, veterinary medicines and feed ingredients including vitamins, additives and trace elements, and with highly precise dosages, for the production of formulated feed rations 125.

It is to be understood that ration weight data 126 comprising input data 120 may include many types of information. Such information may include an overall feed ration weight, a collected ration weight, a ration weight for each component, and a desired ration component weight. Similarly, livestock data 128 may also comprise different types of information, such as that contained in RFID tags associated with a specific animal and other relevant identification characteristics for particular animals. Additionally, timing data 129 may include temporal feeding data such as the desired time for a livestock feeding operation to be undertaken, and the desired time for loading particular components of a feed ration 125.

Figure 2:
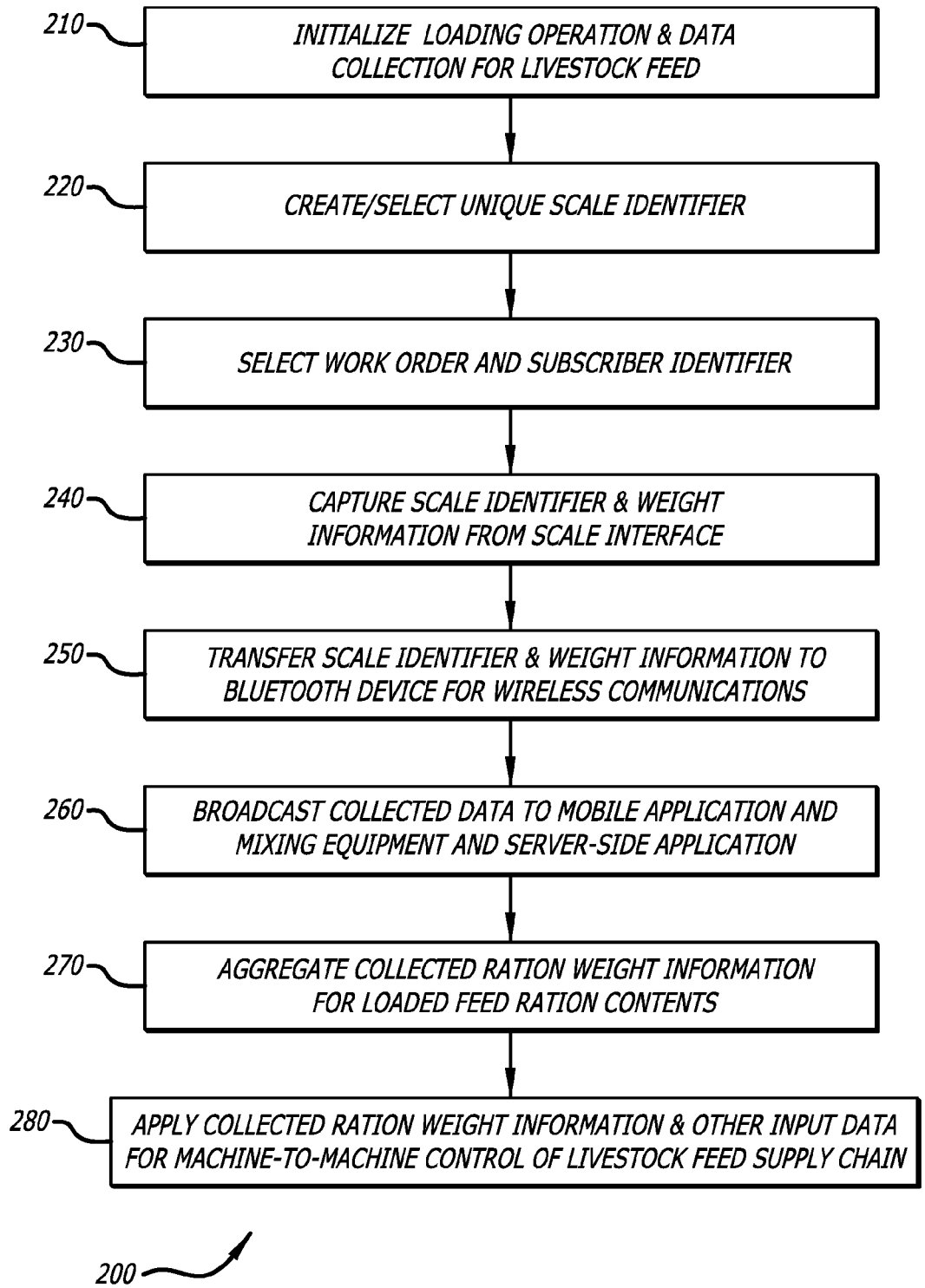
FIG. 2 is a flowchart of steps in a process of performing a framework and workflow for capturing, transferring, storing, and processing of parameters for livestock feeder ration weight information according to one embodiment of the present invention.

FIG. 2 is a flowchart illustrating a process 200 for performing the framework and workflow 100 of the present invention. The process 200 begins at step 210 by initializing a loading operation for a livestock feed ration 125, and at step 220 a unique scale identifier 121 is created or selected for each instance where the workflow 100 will be applied to determine an overall feed ration weight 126 and the individual components thereof. A work order 122 and a subscriber identifier 115 may also be selected at step 230, and a target load/weight feed mixture 117 may also be created for a selected work order 122. The application of the present invention captures the scale identifier 121, and weight information 126 from a scale interface 114 at step 240, for example an RS-232 transmission interface. It then transfers at least the scale identifier 121 and weight information 126 from the RS-232 interface to a Bluetooth® device, such as a dongle, at step 250, and may store such information in a database.

At step 260, at least the weight information 126 is then wirelessly broadcasted via the Bluetooth® device to a mobile application 140 accessible by one or both of an operator of a loader, or the loader itself, to know when to stop loading a particular component of the feed ration 125. The scale identifier 121 itself may also be broadcasted along with the weight information 126, so that the framework and workflow 100 is able to associate collected ration weight information 126 from the particular scale used to weigh components in the instant mixing operation. The framework and workflow 100 therefore generates output data 180 that at least represents an aggregation of collected ration weight information 126 for components of feed loaded into mixing equipment 110 at step 270. This collected ration weight information 126 is applied, together with other input data 120 as necessary, to the server-side application 150 for further machine-to-machine applications and control of the entire supply chain for livestock feed rations 125 at step 280.

The plurality of data processing components may include many components for performing specific functions within the present invention. For example, the framework and workflow 100, and process 200 for performing it, may also include accessing one or more database collections created for management of multiple scales, on-device storage, audit logging, and authentication logging. This activity is managed within an administration component of the plurality of data processing components. The one or more database collections may maintain information within the framework and workflow 100 in either online or offline storage environments. Additionally, one or more external database collections may be accessed for relevant input data 120, for example database collections that store and maintain weather data 127, feedlot data 124, and geographical positioning systems (GPS) or other similar information from which farm/location data 123 can be determined.

As noted above, and as shown in FIG. 1, the present invention may be utilized with one or more mobile applications 140 that are capable of "listening" for new scale identifier 121 and weight or feed ration parameters that represent an initialization of a workflow 100. When the mobile application(s) 140 are in wireless coverage, information such as for example the farm data 123, the feedlot data 124, the scale identifier 121, and weight information 126 may also be transmitted to a server or server-side application 160. Such information may also be persistently stored offline in the one or more database collections in the administration component as discussed above.

The present invention also includes a work order integration component within the plurality of data processing components. Such a component may be configured to integrate the ordering, management, and updating of queues of work orders 122, and pull through completed work orders 122 with a queue, as part of an end-to-end process management functionality for producing a livestock feed ration 125. Regardless, it is to be understood that the framework and workflow 100 of the present invention may be applied to perform multiple work orders 122 in the preparation of a feed ration 125 having different components for different lots or pens of livestock and in different locations/farms, with differing requirements.

The integration component may be further configured to integrate multiple workflows 100 to correlate the ration mixing aspect of feed operations, the transfer of mixed feed 125 into transport equipment, and the actual feeding of the resultant mix to livestock. In this manner, the present invention can be used to track operations throughout the feeding process, from loading individual feed components to consumption by the livestock. This tracking of operations may include full machine-to-machine control 160 of activity across the entire integrated supply chain for livestock feed.

The integration component may also enable correlation and tracking of which feed ration 125 is fed to which particular pen on a feedlot 124. Cattle, for example, are managed in pens, and when a batch of feed is mixed, a large batch can be mixed that feeds more than one pen of cattle. One batch may be delivered to three different pens, and it is important to know how many pounds or kilograms of each batch is delivered to each pen to track performance. Geofencing capabilities from the use of GPS or RFID technology to create virtual geographic boundaries for a feedlot 124 or farm/location 123 or also enable knowledge of what pen is feeding to help accurately track how much was provided to each pen.

It is to be understood that the framework and workflow 100 of the present invention may include many additional aspects and elements, in one or more embodiments thereof. For example, the present invention may incorporate the capture of weather information 127 at the point and time of mixing, and at the point and time of feeding. Such information may be of value to correlating a weather risk due to factors such as spoliation or other nutrients needed in certain weather conditions, and potential remedies or mitigative actions. Additionally, the present invention may also incorporate location information 123 at the point and time of feeding. The physical location of the feedlots may be added by incorporating geofencing capability to recognize where a feeding operation is taking place. Such capability may incorporate global positioning system (GPS) technology and/or radio frequency identification (RFID) to define geographical boundaries of the feedlot's location 123, and transmit and store such information for later use.

The present invention may also be configured to read other types of location-based sensors, such as RFID tags on the livestock. Such livestock-specific information 128 may be processed and stored for later use, for example for traceability or other tracking such as in third-party applications used by veterinarians, nutritionists, and regulatory agencies, or in machine-to-machine control of the supply chain of providers for a feed ration 125. In one example of a tracking application, it may be beneficial to determine antibiotic usage in a particular animal or lot of animals, and the ability to read and incorporate such sensors enables such capability within the framework and workflow 100.

The present invention may be further configured to associate other relevant information to the loading and mixing operation for a feed ration 125. For example, label information from high-energy nutrient formulae that are manufactured and prescribed by large food companies may have multiple ingredients in the ration 125. Identification of trace ingredients in individual components from these manufacturers enables a sustainability and traceability capability. Therefore, output data 180 may be configured to provide such sustainability and traceability capabilities by identifying each component of a feed ration 125 and details of its use and manufacture. Such information may also be accessible via an application programming interface (API) as described further below.

The present invention may further include a component configured to generate output data 180 on a graphical user interface from the one or more mobile applications 140, for example on a computing device on which the mobile application 140 is used to manage a feeding operation for a feed ration 125. The mobile application 140 may be configured to provide information via the graphical user interface, such as the amount of a particular component that has been loaded into mixing equipment 110. A server-side application 150 may also be included as noted above to translate data collected by from the scale interface 114 and mixing equipment 110, and wirelessly transmitted using Bluetooth® technology 132 as noted above, for the mobile application 140 and use thereof.

The data processing components may therefore be configured to perform one or more mathematical modeling functions on the ration weight information 126 collected during loading of mixing equipment 110. Such mathematical modeling functions may apply the collected ration weight information 126 to produce additional information as output data 180, for example for use as noted above by veterinarians, nutritionists, regulatory agencies, and livestock marketing organizations. In one embodiment, the mathematical modeling functions may correlate feedlot destination information with the nutritional content in collected ration weight information 124 to model growth rates in livestock designated to consume such a feed ration 125 on a specific feedlot 124. These mathematical modeling functions may include, as discussed further below, one or more layers of machine learning and artificial intelligence 170 to for further capabilities within the framework and workflow 100 of the present invention.

As noted above, the present invention may also enable one or more specific application programming interface (API) modules to provide particular information or services and generate specific outcomes, such as one or more specific advisory services. APIs may be tailored to provide specific services, management actions, or information. Alternatively, services may be provided directly by the framework and workflow 100 of the present invention. For example, the present invention may include an alerting module configured to generate alerts to livestock marketing organizations, manufacturers of particular feed components, nutritionists, and buyers or auctioneers of livestock. Alerts may also be configured so that when a feed ration 125 is mixed and ready for transport, a notification is provided to a feedlot 124 that the feed ration 125 is completed and being transported. It is to be understood that many types of alerting are possible within the present invention, and it is not to be limited to any one type of alert mentioned herein.

The framework and workflow 100 of the present invention also includes one or more machine learning and artificial intelligence layers 170 that characterize the influence of environmental relationships on follow-on aspects of preparing a livestock feed ration 125, such as for example growth rates in livestock consuming such a feed ration. These machine learning and artificial intelligence layers 170 comprise models that may be utilized to develop predictions and forecasts that provide notifications, advisories, and recommendations, for example for appropriate products, additives, or components in a feed ration 125, and for machine-to-machine control of an integrated supply chain 160 for components of a feed ration 125. The framework and workflow 100 links information in input data 120 such as amounts of components in a feed ration 125, feedlot data 124, livestock data 128, and weather data 127, and machine learning/artificial intelligence techniques 170, to generate such forecasts and predictions.

In one example of the use of such machine learning and artificial intelligence models 170, these may be utilized to model growth rates in livestock designated to consume a feed ration 125, either generally or with regard to a particular feedlot 124. In such an example, the framework and workflow 100 of the present invention may correlate feedlot destination information with nutritional content in collected ration weight information for each feed ration 125. The information may be analyzed, using one or more mathematical modeling functions such as net energy maintenance models and total digestible nutrient models, and in conjunction with these models and techniques, to generate predictions based on the collected ration weight information 126 and on relationships developed between other variables in the input data 120 as noted above.

The present invention may also utilize hierarchical and iterative training of machine learning algorithms to improve prediction for localized conditions on a particular pen or a particular feedlot. Input data 120 may be analyzed in a suite of predictive models configured to capture general relationships between product performance of a feed ration 125 and/or its components, relevant environmental variables, and local management practices that operate to modify the influence of the environment on feed ration performance. A decision support tool may also be configured, either with the mobile application 140 or the server-side application 150 or both, that supports mixing and loading operations and an integrated supply chain 160 of products and machinery involved in a producing a feed ration 125.

The present invention contemplates that many different types of machine learning and artificial intelligence 170 may be employed within the scope thereof, and therefore, the one or more machine learning and artificial intelligence layers 170 may include one or more of such types of machine learning and artificial intelligence. These models may apply techniques that include, but are not limited to, k-nearest neighbor (KNN), logistic regression, support vector machines or networks (SVM), and one or more neural networks. Regardless, the use of machine learning and artificial intelligence in the framework and workflow 100 of the present invention enhances the utility of analyzing collected weight information 126 for a feed ration 125 and its various components by automatically and heuristically constructing appropriate relationships, mathematical or otherwise, relative to the environmental variables influencing follow-on outcomes such as livestock growth rates and adjustment of amounts and types of components, nutrients, and other additives in livestock feed.

It is to be understood that the word "livestock" in the present invention may refer to any type of livestock for which a mechanized feeding operation may be undertaken, and the scope of this disclosure is not to be limited to any one specific type of livestock referred to herein, nor is it to be limited to feed rations 125 for any one type of livestock referred to herein. Livestock may therefore include, but not be limited in any way to, beef cattle, dairy cattle, swine, pigs or hogs, poultry, sheep, goats, bison, horses, etc.

The systems and methods of the present invention may be implemented in many different computing environments. For example, the framework and workflow for livestock feeding operations may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
   initializing a collection of input data that includes livestock feed data for one or more components of a feed ration and a scale identifier, in a feed mixing operation for livestock feed;
   capturing the scale identifier from a scale interface configured with feed mixing equipment for the feed ration;
   capturing weight information for each component in the livestock feed data from the scale interface as the one or more components of the feed ration are loaded into the feed mixing equipment;
   broadcasting at least the scale identifier and the weight information for each component over an asynchronous wireless radio communication connection to a receiver coupled to the feed mixing equipment as the livestock feed data is being loaded into the feed mixing equipment, to at least one mobile application configured to process the weight information, and to at least one server-side application configured to apply the weight information to supply chain providers for the feed ration, in a computing environment in which a plurality of data processing modules are executed in conjunction with at least one specifically-configured processor, the plurality of data processing modules configured to adapt at least the weight information for display using the mobile application during the feed mixing operation to determine a collected weight of the overall feed ration and each component thereof as the one or more components are being loaded in the feed mixing equipment; and
   generating output data that at least represents weight information for each of the one or more components of the feed ration loaded into the feed mixing equipment, and transmitting the weight information for each of the one or more components of the feed ration to the server-side application.

2. The method of claim 1, wherein the asynchronous wireless radio communication connection includes a Bluetooth® communications protocol.

3. The method of claim 1, further comprising selecting a work order and a subscriber identifier associated with one or both of the feed ration and individual components in the one or more components of the feed ration, and creating a feed load target and a feed mixture weight for a selected work order.

4. The method of claim 3, further comprising integrating multiple work orders for a preparation of the feed ration, the feed ration having different requirements, for each lot of livestock and in each feedlot location.

5. The method of claim 1, further comprising capturing each scale identifier for a plurality of scales in an integrated supply chain for delivery of the one or more components of the feed ration.

6. The method of claim 1, further comprising receiving spatial and temporal weather data relative to a time of mixing the feed ration.

7. The method of claim 6, further comprising receiving spatial and temporal feedlot data, the feedlot data comprising information for each pen on a feedlot, and livestock tag data for livestock, and correlating the livestock tag data with the feedlot data to identify location information at a time of feeding to track which feed ration is fed to which pen on the feedlot.

8. The method of claim 7, wherein the plurality of data processing modules are further configured to model growth rates in livestock designated to consume the feed ration on a specific feedlot using one or more artificial intelligence techniques that correlate feedlot destination information with nutritional content in collected ration weight information for each feed ration to generate predictions based the collected ration weight information and on relationships developed between amounts of the one or more components in the feed ration, the feedlot data, the livestock tag data, and the weather data.

9. A method, comprising:
   identifying at least one triggering condition to initialize a collection of input data for a livestock feed mixing operation, the input data including livestock feed data for one or more components of a feed ration, the at least one trigger condition representing one or both of a ready indication from feed ration loading equipment that the one or more components of the feed ration are ready for mixing in feed mixing equipment, and an indication from the feed mixing equipment that the feed ration is ready for a next component;
   selecting at least one scale identifier and at least one subscriber identifier from a subscriber database and a scale database based on the at least one triggering condition;
   associating the at least one triggering condition with one or more scale identification parameters and a desired ration component weight for each component of the feed ration to be loaded in the feed mixing equipment;
   transmitting the at least one subscriber identifier, the least one scale identifier and the desired ration component weight to a mobile application associated with the at least one scale identifier and configured to process weight information for the feed ration over an asynchronous wireless radio communication connection to a receiver coupled to the feed mixing equipment as the one or more components of the feed ration ae being loaded into the feed mixing equipment, within a computing environment in which a plurality of data processing modules are executed in conjunction with at least one specifically-configured processor, the plurality of data processing modules configured to adapt the weight information for the feed ration for display using the mobile application during the feed mixing operation to determine a collected weight of the overall feed ration and each component thereof as the one or more components are being loaded in the feed mixing equipment; and
   transmitting the subscriber identifier, the least one scale identifier, the desired ration component weight, the weight information, and the collected weight of the overall feed ration and each component thereof to at least one server-side application configured to apply the weight information, the desired ration component weight, and the collected weight of the overall feed ration and each component thereof to an integrated supply chain of feed ration providers to the livestock feeding operation for preparation of the one or more components of the feed ration for the feed mixing operation.

10. The method of claim 9, wherein the asynchronous wireless radio communication connection includes a Bluetooth® communications protocol.

11. The method of claim 9, further comprising selecting a work order and associating the work order with the least one subscriber identifier and one or both of the feed ration and individual components in the one or more components of the feed ration, and creating a feed load target and a feed mixture weight for a selected work order.

12. The method of claim 11, further comprising integrating multiple work orders for a preparation of the feed ration, the feed ration having different requirements, for each lot of livestock and in each feedlot location.

13. The method of claim 9, further comprising selected scale identifiers for a plurality of scales in the integrated supply chain for delivery of the one or more components of the feed ration.

14. The method of claim 9, further comprising receiving spatial and temporal weather data relative to a time of mixing the feed ration.

15. The method of claim 14, further comprising receiving spatial and temporal feedlot data, the feedlot data comprising information for each pen on a feedlot, and livestock tag data for livestock, and correlating the livestock tag data with the feedlot data to identify location information at a time of feeding to track which feed ration is fed to which pen on the feedlot.

16. The method of claim 15, wherein the plurality of data processing modules are further configured to model growth rates in livestock designated to consume the feed ration on a specific feedlot using one or more artificial intelligence techniques that correlate feedlot destination information with nutritional content in collected ration weight information for each feed ration to generate predictions based the collected ration weight information and on relationships developed between amounts of the one or more components in the feed ration, the feedlot data, the livestock tag data, and the weather data.

17. A system, comprising:
a data collection and initialization component configured to:
initialize a collection of input data that includes livestock feed data for one or more components of a feed ration and a scale identifier, in a feed mixing operation for livestock feed,
capture the scale identifier from a scale interface configured with feed mixing equipment for the feed ration, and
capture weight information for each component in the livestock feed data from the scale interface as the one or more components of the feed ration are loaded into the feed mixing equipment;
a data transmission component configured to broadcast at least the scale identifier and the weight information for each component over an asynchronous wireless radio communication connection to a receiver coupled to the feed mixing equipment as the livestock feed data is being loaded into the feed mixing equipment, to at least one mobile application configured to process the weight information, and to at least one server-side application configured to apply at least the weight information to an integrated supply chain of feed ration providers to the livestock feeding operation for preparation of the one or more components of the feed ration for the feed mixing operation; and
a plurality of data processing components in a computing environment in which a plurality of data processing modules are executed in conjunction with at least one specifically-configured processor, the plurality of data processing modules configured to adapt at least the weight information for display using the mobile application during the feed mixing operation to determine a collected weight of the overall feed ration and each component thereof as the one or more components are being loaded in the feed mixing equipment and integrate one or more additional inputs that include weather information and location information for a geographical location where the feed ration is to be consumed, and generate output data that at least represents the weight information for each of the one or more components of the feed ration loaded into the feed mixing equipment.

18. The system of claim 17, wherein the asynchronous wireless radio communication connection includes a Bluetooth® communications protocol.

19. The system of claim 17, wherein the data collection and initialization component is further configured to select a work order and a subscriber identifier associated with one or both of the feed ration and individual components in the one or more components of the feed ration, create a feed load target and a feed mixture weight for a selected work order, and integrate multiple work orders for a preparation of the feed ration, the feed ration having different requirements, for each lot of livestock and in each feedlot location.

20. The system of claim 17, wherein the data collection and initialization component is further configured to capture each scale identifier for a plurality of scales in an integrated supply chain for delivery of the one or more components of the feed ration.

21. The system of claim 17, wherein the data collection and initialization component is further configured to collect spatial and temporal weather data relative to a time of mixing the feed ration, and spatial and temporal feedlot data, the feedlot data comprising information for each pen on a feedlot, and livestock tag data for livestock, and correlating the livestock tag data with the feedlot data to identify location information at a time of feeding to track which feed ration is fed to which pen on the feedlot.

22. The system of claim 21, wherein the plurality of data processing modules are further configured to model growth rates in livestock designated to consume the feed ration on a specific feedlot using one or more artificial intelligence techniques that correlate feedlot destination information with nutritional content in collected ration weight information for each feed ration to generate predictions based the collected ration weight information and on relationships developed between amounts of the one or more components in the feed ration, the feedlot data, the livestock tag data, and the weather data.

* * * * *